(12) United States Patent
Caferro et al.

(10) Patent No.: US 8,894,232 B2
(45) Date of Patent: Nov. 25, 2014

(54) UNIVERSAL LIGHT-EMITTING DIODE RETROFIT ASSEMBLY FOR LIGHT FIXTURES

(71) Applicant: Ecolite Manufacturing Co., Spokane Valley, WA (US)

(72) Inventors: Edward Nicholas Caferro, Spokane, WA (US); Timothy Lee Treto, Mead, WA (US)

(73) Assignee: Ecolite Manufacturing Co., Spokane Valley, WA (US)

(*) Notice: Subject to any disclaimer, the term of this patent is extended or adjusted under 35 U.S.C. 154(b) by 144 days.

(21) Appl. No.: 13/854,049

(22) Filed: Mar. 30, 2013

(65) Prior Publication Data

US 2013/0223100 A1    Aug. 29, 2013

Related U.S. Application Data

(63) Continuation of application No. 13/193,039, filed on Jul. 28, 2011, now Pat. No. 8,764,216.

(51) Int. Cl.
*F21S 8/06* (2006.01)
(Continued)

(52) U.S. Cl.
CPC .............. *F01S 8/043* (2013.01); *F21V 29/004* (2013.01); *F21V 29/22* (2013.01); *F21V 15/01* (2013.01); *F21V 15/011* (2013.01); *F21V 17/107* (2013.01); *G02B 6/0011* (2013.01); *G02B 6/0023* (2013.01); *G02B 6/0031* (2013.01); *F21S 8/026* (2013.01); *E04B 9/003* (2013.01); *E04B 9/32* (2013.01); *F21S 2/005* (2013.01); *F21Y 2101/02* (2013.01); *F21Y 2103/003* (2013.01); *F21Y 2105/00* (2013.01);

*G02B 6/0068* (2013.01); *G02B 6/0085* (2013.01); *G02B 6/0088* (2013.01); *Y10S 362/80* (2013.01)
USPC ............ 362/148; 362/800; 362/605; 362/576

(58) Field of Classification Search
USPC ......... 362/147, 148, 150, 605, 602, 634, 511, 362/330, 612, 633, 374, 375, 576, 364, 365
See application file for complete search history.

(56) References Cited

U.S. PATENT DOCUMENTS 7,547,112 B2 *   6/2009   Kim ............................... 362/148
7,954,975 B2 *   6/2011   Zhou ............................. 362/147
(Continued)

OTHER PUBLICATIONS

Canadian Office Action mailed Oct. 1, 2012 for Canadian patent application No. 2777875, a counterpart foreign application of U.S. Appl. No. 13/193,039, 3 pages.

(Continued)

*Primary Examiner* — Jong-Suk (James) Lee
*Assistant Examiner* — Leah S Macchiarolo
(74) *Attorney, Agent, or Firm* — Lee & Hayes, PLLC

(57) ABSTRACT

A light-emitting diode (LED) system to retrofit a light fixture has a frame configured to be installed under an existing light fixture and a LED lighting assembly couplable to the frame. In one example, the frame is formed as a plurality of rails having a flange to be installed between the light fixture and a grid member of a ceiling suspension system. The frame may be installed without removal of the existing light fixture. The LED lighting assembly includes an LED array and an optical waveguide for dispersing light from the LED array. The LED system maintains a thin profile, enabling it to retrofit existing light fixtures. Installation time is reduced, thereby reducing labor costs, while the LED lighting provides more light with less energy.

30 Claims, 10 Drawing Sheets

(51) Int. Cl.
*F21V 29/00* (2006.01)
*F21V 15/01* (2006.01)
*F21V 17/10* (2006.01)
*F21V 8/00* (2006.01)
*F21S 8/02* (2006.01)
*E04B 9/00* (2006.01)
*E04B 9/32* (2006.01)
*F21S 2/00* (2006.01)
*F21Y 101/02* (2006.01)
*F21Y 103/00* (2006.01)
*F21Y 105/00* (2006.01)

(56) References Cited

U.S. PATENT DOCUMENTS

2001/0050850 A1    12/2001    Plunk
2007/0133193 A1*   6/2007    Kim .............................. 362/147
2009/0034204 A1    2/2009    Wayman et al.
2009/0109670 A1    4/2009    Boyer
2009/0196024 A1*   8/2009    Heiking et al. ............... 362/150
2010/0188601 A1    7/2010    Onishi
2011/0090422 A1    4/2011    Hamada
2011/0175533 A1*   7/2011    Holman et al. ............... 315/130
2012/0176733 A1*   7/2012    Daly .............................. 361/622

OTHER PUBLICATIONS

Office Action for U.S. Appl. No. 13/193,039, mailed on Oct. 9, 2013, Edward Nicholas Caferro, "Universal Light-Emitting Diode for Light Fixtures", 15 pages.

Office Action for U.S. Appl. No. 13/193,110, mailed on Nov. 4, 2013, Edward Nicholas Caferro, "Universal Light-Emitting Diode Heat Systems and Lighting Features", 10 pages.

* cited by examiner

UNIVERSAL LIGHT-EMITTING DIODE RETROFIT ASSEMBLY FOR LIGHT FIXTURES

RELATED APPLICATIONS

This application is a Continuation application which claims priority to commonly assigned co-pending U.S. patent application Ser. No. 13/193,039, entitled "Universal Light-Emitting Diode For Light Fixtures," filed Jul. 28, 2011, which is incorporated by reference herein for all that it teaches and discloses.

BACKGROUND

Existing lighting systems are inefficient and consume too much energy. For example, most commercial buildings employ fluorescent lighting systems which may have a low luminous efficacy and/or efficiency. In addition, there exist government incentives (e.g., rebates and/or funding) to update buildings by retrofitting such fluorescent lighting systems with more efficient lighting systems of higher luminous efficacy and/or efficiency.

One challenge in retrofitting existing lighting systems is that there are many different models and widely varying structural specifications. For instance, fluorescent lighting systems installed in a hanging ceiling might come in hundreds of models. A single company may offer, for example, up to 55 different recessed fixtures, each of these fixtures having subtle differences. Each fixture may have a different shaped lamp holder cavity, a different shaped light seal surface, different shaped air handlers (i.e., different flange configurations depending on if the air handlers are to supply or to return air for a room), a different fixture contour, and so forth. Accordingly, there remains a need for a retrofit lighting system that has a higher luminous efficacy and/or efficiency and yet universally retrofits to many different lighting systems.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
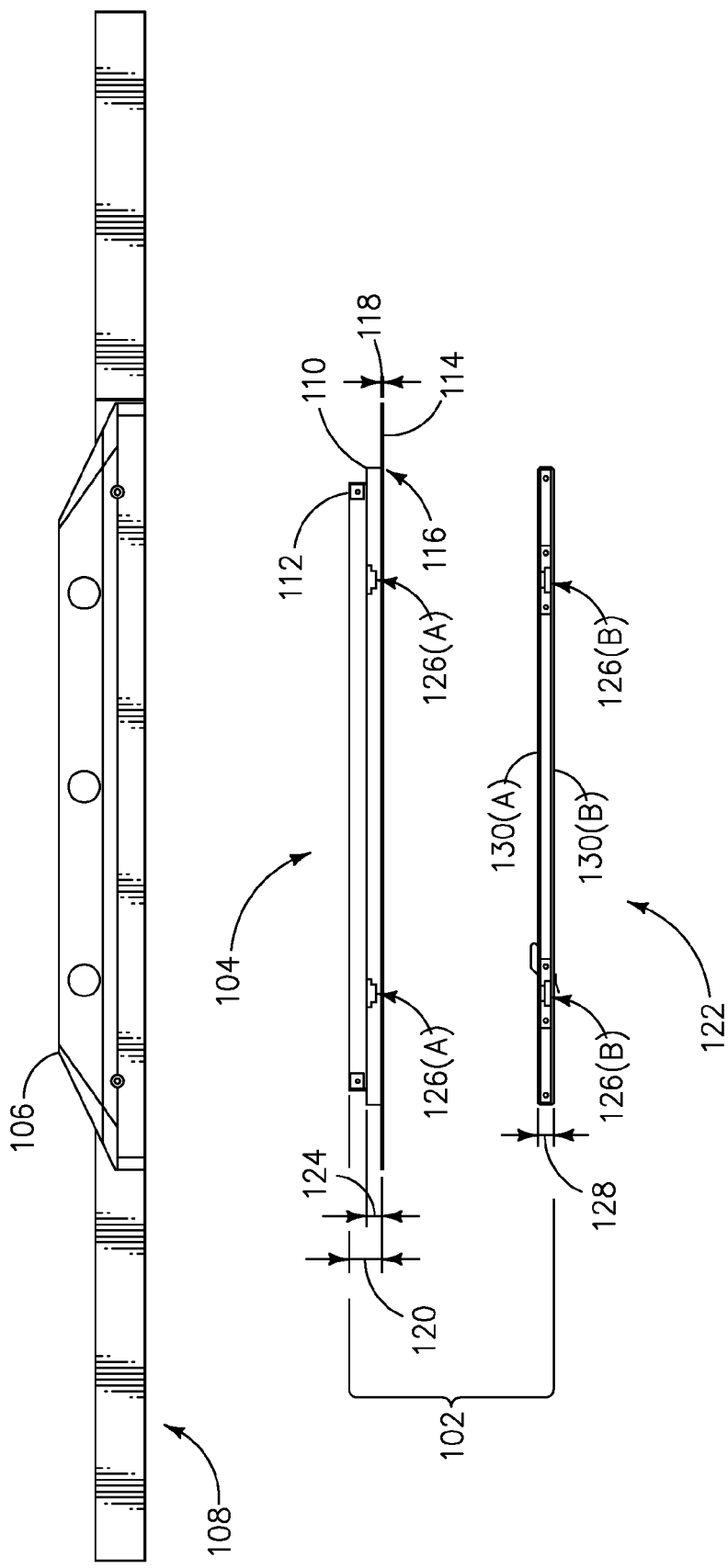
FIG. 1 depicts a side view of an illustrative light-emitting diode (LED) system to retrofit a fluorescent light fixture.

Retrofit light-emitting diode (LED) systems used to retrofit existing lighting systems are described. A retrofit LED system includes a frame and a LED lighting assembly couplable to the frame. The frame is configured to be installed under an existing light fixture, such as a fluorescent light fixture. The LED lighting assembly employs an LED array and engine, enabling a thin profile in comparison to existing fluorescent lighting fixtures. As a result, retrofit LED systems according to this disclosure are adaptable to retrofit existing light fixtures.

The frame is designed to fit into apertures for existing lighting fixtures and to be assembled in a short period of time. For example, an installer may install a frame of the retrofit LED system by inserting a flange of the frame under the fluorescent light fixture, between the fluorescent light fixture and a rail of a ceiling suspension system. An installer may then couple the LED lighting assembly to the frame. Because the LED lighting assembly has a compact profile, the lighting assembly provides for the frame to have a compact profile. The compact profile allows the frame to be installed under an existing fluorescent light fixture well within any obstruction (i.e., any different shaped lamp holder cavity, any different shaped light seal surface, any different shaped air handlers (i.e., different flange configurations depending on if the air handlers are to supply or to return air for a room), any different fixture contour, etc.) of the existing fluorescent light fixture. In some cases, it has been observed that an installer can install the retrofit LED system in about 5 minutes or less. Further, because the LED lighting assembly utilizes LEDs, the retrofit LED system may have a high luminous efficacy and/or efficiency compared to an existing fluorescent light fixture. In addition to providing light with less energy the LEDs have a much longer life than existing fluorescent lights. For example, the retrofit LED system may provide light for about 50,000 hours, 70,000 hours, 100,000 hours, or longer. In this manner, the retrofit LED system can be installed faster, saving time and money, while providing light with less energy (i.e., a higher luminous efficacy and/or efficiency).

Generally, a retrofit LED system according to this disclosure has a frame and a LED lighting assembly coupled to the frame. The frame includes a jamb arranged around an inside perimeter to receive the LED lighting assembly. The frame further includes a flange arranged around an outside perimeter, but opposite the jamb. The flange is arranged to be installed under the existing light fixture, between the light fixture and a rail of a ceiling suspension system.

For discussion purposes, the retrofit LED system is described in various embodiments herein as retrofitting a fluorescent light fixture installed in a ceiling suspension system. However, the retrofit LED system may be used to retrofit other types of light fixtures than fluorescent fixtures. Further, while the retrofit LED system is described in various embodiments herein as including LEDs, other light generating sources may be used. For example, the retrofit LED system may include organic light-emitting diodes (OLEDs), polymer light-emitting diodes (PLEDs), phosphorescent organic light-emitting diodes (PHOLEDs) or any other suitable light source. The retrofit LED system may use any efficient low profile light technology suitable for retrofitting an existing light fixture. Further, the retrofit LED system may be installed directly in the ceiling suspension system, such as, for example, the retrofit LED system may be installed in a new ceiling suspension system and not under an existing fluorescent light fixture.

In one embodiment, the frame is equipped with a plurality of rails that form the flange to be installed under the light fixture, between the light fixture and a rail of a ceiling suspension system. The rails may be a single unit (i.e., multiple rails loosely connected) and installed as a single unit under the light fixture.

In another embodiment, the frame has a pair of end rails and a pair of side rails. Each of the end rails and side rails is formed with the flange to be installed under the light fixture.

In still another embodiment, the LED lighting assembly is formed of an optical waveguide and a plurality of LEDs arranged to inject light into the optical waveguide. The LEDs may be arranged, for example, to inject light into an edge of the optical waveguide. Alternatively, the LEDs may be arranged above a planar surface of the optical waveguide to inject light into the planar surface.

In another embodiment, the optical waveguide may be formed with multiple pockets arranged in a pattern having a density of about 121 pockets per square inch. The optical waveguide may also include a plurality side-throw optics arranged in a planar surface of the optical waveguide.

In an embodiment, the retrofit LED system includes a heat spreader for dissipating heat from a plurality of LEDs. The heat spreader may include a channel housing an edge of the optical waveguide and having a portion of the plurality of LEDs fixed in the channel via a thermal interface. The heat spreader may also include a plate extending distal to the channel covering a portion of a planar surface of the optical waveguide. The plate having a dimple forceably in contact with the portion of the planar surface. In another embodiment, a heat spreader may have a plate extending between a pair of channels covering the planar surface of the optical waveguide. The heat spreader for dissipating heat from the plurality of LEDs fixed in the channels.

Illustrative Retrofit LED System

FIG. 1 depicts a side view of an illustrative light-emitting diode (LED) system 102 to retrofit a fluorescent light fixture. The LED system 102 includes a frame 104 to be installed under a fluorescent light fixture 106 installed in a ceiling suspension system 108. The frame 104 has a jamb 110 arranged around an inside perimeter 112 and a flange 114 arranged around an outside perimeter 116 of the frame 104 opposite the jamb 110. The frame 104 defines an interior opening and the jamb 110 extends into the interior opening. The jamb 110 provides a light seal surface for a lighting assembly that is connectable to the frame 104. The flange 114 is arranged to project externally from the outside perimeter 116 away from an interior opening and opposite the jamb 110. The frame 104 may be formed of metal, plastic, wood, and/or any other suitable material, to be installed in a ceiling suspension system. For example, the frame 104 may be formed of sheet metal (e.g., cold rolled steel (CRS)) having a thickness of about 0.04 inches (1 millimeter). Further, the flange 114 may have a material thickness of about the same as the sheet metal thickness of the frame 104. For example, if the frame 104 is formed of 0.036 CRS, then the flange 114 may have a thickness 118 of about 0.04 inches (1 millimeter). In the illustrated embodiment, the flange 114 is shown as having the sheet metal thickness of the frame 104 (e.g., 0.4 inches (1 millimeter)). However, the flange 114 may be formed of any suitable thickness and/or shape effective to be installed under the fluorescent light fixture 106, between the fluorescent light fixture 106 and a rail of the ceiling suspension system 108. For example, the flange 114 may alternatively range from about half the sheet metal thickness of the frame 104 to two times the sheet metal thickness of the frame 104. Other suitable thicknesses may be employed in other retrofit environments.

As illustrated, the frame 104 has a compact profile exhibited by a thin height 120, which allows the frame 104 to be installed under the fluorescent light fixture 106 and well within any obstruction presented by the fluorescent light fixture 106. As a result, the frame 104 may be installed within the fluorescent light fixture 106 without removing the fluorescent bulbs installed in the fluorescent light fixture 106, thereby reducing installation time and saving removal costs. In addition, because the LED assembly 102 may be installed within the fluorescent light fixture 106, without removing the fluorescent bulbs, disposal of the fluorescent bulbs may be avoided saving disposal costs. As one example, the overall height 120 may be about 1 inch (25 millimeters), although other thicknesses may be used.

As further illustrated in FIG. 1, the LED system 102 may include an LED lighting assembly 122 that is connectable to the frame 104. The jamb 110 of the frame 104 receives the LED lighting assembly 122. The jamb 110 providing a light seal surface that receives the LED lighting assembly 122 such that light dispersed from the LED lighting assembly 122 is not allowed to pass between the jamb 110 (i.e., light seal surface) and the LED lighting assembly 122. For example, the jamb 110 (i.e., light seal surface) does not allow light dispersed from within the LED system 102 from illuminating a perimeter or edge of the LED lighting assembly 122 when the LED lighting assembly 122 is received by the jamb 110. In one implementation, the jamb 110 has a jamb height 124 of approximately 0.5 inches (13 millimeters). While FIG. 1 illustrates a jamb height 124 of approximately 0.5 inches, the jamb height may have a height less than 0.5 inches. For example, the jamb height 124 may be any height suitable for receiving an LED lighting assembly having a height less than 0.5 inches. Further, the jamb height 124 may be any height suitable for receiving an LED lighting assembly having a height greater than 0.5 inches. The LED lighting assembly 122 may be pivotably coupled to the frame 104 via cooperating hinge members 126(A) and 126(B). The first hinge member 126(A) may be attached to the frame 104 and the associated hinge member 126(B) may be attached to the LED lighting assembly 122. The hinge members 126(A) and 126(B) are configured to allow coupling and decoupling from one another, such that when coupled, the hinge members permit pivotal movement of the LED lighting assembly 122 relative to the frame 104.

While FIG. 1 illustrates this pivotal coupling, it is noted that any coupling mechanism may be used. For example, the LED lighting assembly 122 may be coupled to the frame 104 via a snap fit, a fastener (e.g., a screw), magnets, springs, or the like.

The LED lighting assembly 122 may have a height 128 that is approximately equal to the jamb height 124 of the jamb 110. Further, the height 128 of the LED lighting assembly 122 may have a height defined by an edge of an optical waveguide. For example, an edge of an optical waveguide may have a height ranging from about 0.08 inches (2 millimeters) to about 0.2 inches (6 millimeters). While the height 128 of the LED lighting assembly 122 may have a height slightly more than the height ranging from about 0.08 inches (2 millimeters) to about 0.2 inches (6 millimeters) to house the edge of the optical waveguide. With these profile heights, the LED lighting assembly 122 may be comfortably received by the jamb 110 and maintain the thin profile. FIG. 1 illustrates the LED lighting assembly 122, when received by the jamb 110, as resting flush with the flange 114 of the frame 104. However, in other implementations, only a portion of the LED lighting assembly 122 may be received by the jamb 110. For example, instead of the LED lighting assembly 122 being flush with the flange 114, the LED lighting assembly 122 may protrude from the flange 114, thereby increasing the overall height of the system.

Alternatively, the LED lighting assembly 122 may be recessed in the jamb 110. Further, because the height 128 of the LED lighting assembly 122 provides a compact profile (i.e., a thin height of about 0.5 inches) the jamb height 124 of the frame 104 is able to provide a compact profile (i.e., a height of about 0.5 inches). Further, because the frame 104 provides a compact profile, the overall height 120 of the frame 104 is minimized providing an overall thin profile (i.e., an overall compact height of about 1 inch). As a result, the LED system 102 maintains a thin profile (i.e., an overall compact height of about 1 inch), which allows the LED system 102 to be installed under the fluorescent light fixture 106 well within any obstruction. For example, the LED system 102 may be installed under any fluorescent light fixture 106 having any different shaped lamp holder cavity, any different shaped light seal surface, any different shaped air handlers (i.e., different flange configurations depending on if the air handlers are to supply or to return air for a room), any different fixture contour, etc.

FIG. 1 also illustrates the LED lighting assembly 122 housing an optical waveguide having a planar surface 130(A) opposite another planar surface 130(B) (i.e., co-planar surfaces). Generally, the LED lighting assembly 122 disperses light from the other planar surface 130(B) away from the ceiling suspension system 108.

Figure 2:
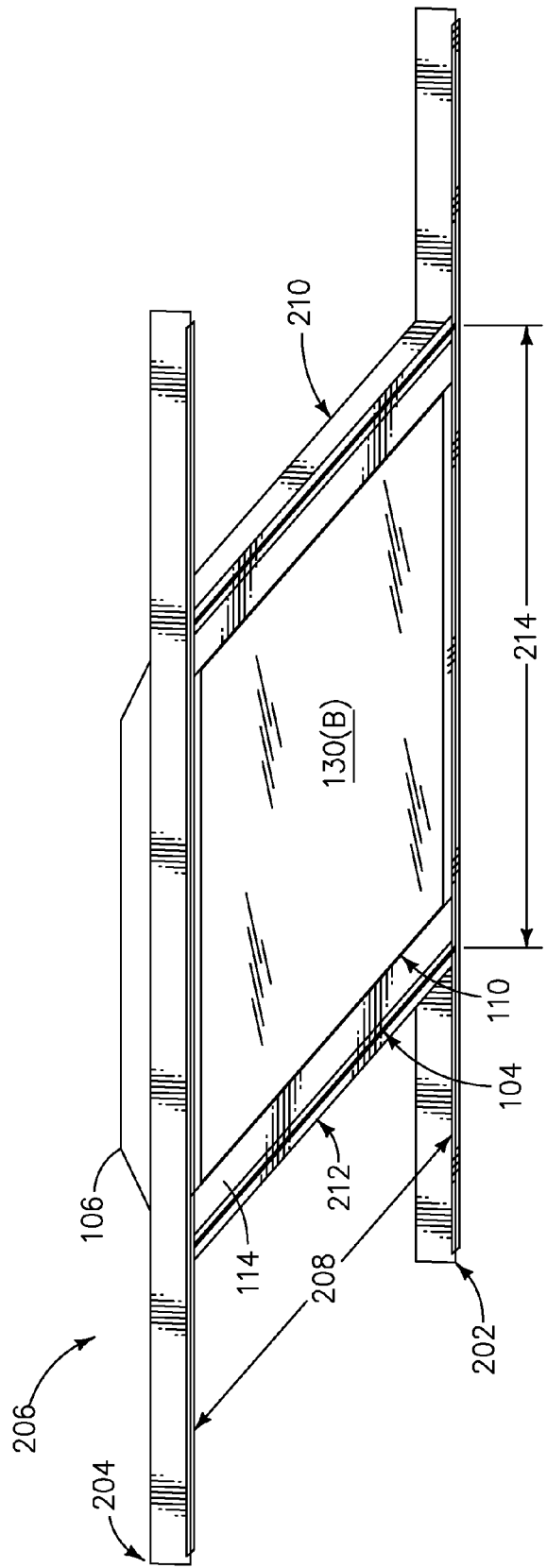
FIG. 2 depicts a perspective view of the illustrative LED system installed under the fluorescent light fixture in FIG. 1.

FIG. 2 depicts a perspective view of the illustrative LED system installed under the fluorescent light fixture in FIG. 1. FIG. 2 illustrates the LED lighting assembly 122 may be receive by the jamb 110 and may be flush with the flange 114 of the frame 104. The frame 104 may be installed between a first grid member 202 and a second grid member 204 of a ceiling suspension system 206. In the illustrated embodiment, the ceiling suspension system 206 is shown as having grid members designed to support a suspended ceiling (i.e., an acoustical ceiling). However, the grid members may include secondary cross beams (i.e., cross runners, and/or a cross tees) effective to form different module sizes (i.e., grid shapes of a ceiling suspension system). While FIG. 2 illustrates the first grid member 202 and the second grid member 204 of the ceiling suspension system 206 separated by a distance 208 of about 24 inches (61 centimeters), the first grid member 202 and second grid member 204 may be separated by any distance. For example the grid members (e.g., the first grid member 202 and second grid member 204) of the ceiling suspension system 206 may be separated by any distance specified by a standards organization (e.g., American Society for Testing and Material (ASTM)). For example the first grid member 202 and second grid member 204 may be separated by a distance of about 12 inches (30 centimeters), 24 inches (61 centimeters), or any other distance.

FIG. 2 further illustrates the frame 104 may also be installed between a third grid member 210 and a fourth grid member 212 of the ceiling suspension system 206. Again the grid members (e.g., the third grid member 210 and fourth grid member 212) of the ceiling suspension system 206 may be separated by any distance specified by a standards organization. For example the third grid member 210 and fourth grid member 212 may be separated by a distance 214 of about 24 inches (61 centimeters), 48 inches (122 centimeters), or any other distance. With the frame 104 arranged between the grid members of the ceiling suspension system 206, the other planar surface 130(B) of the LED lighting assembly 122 is positioned approximately level with the ceiling suspension system 206.

Figure 3:
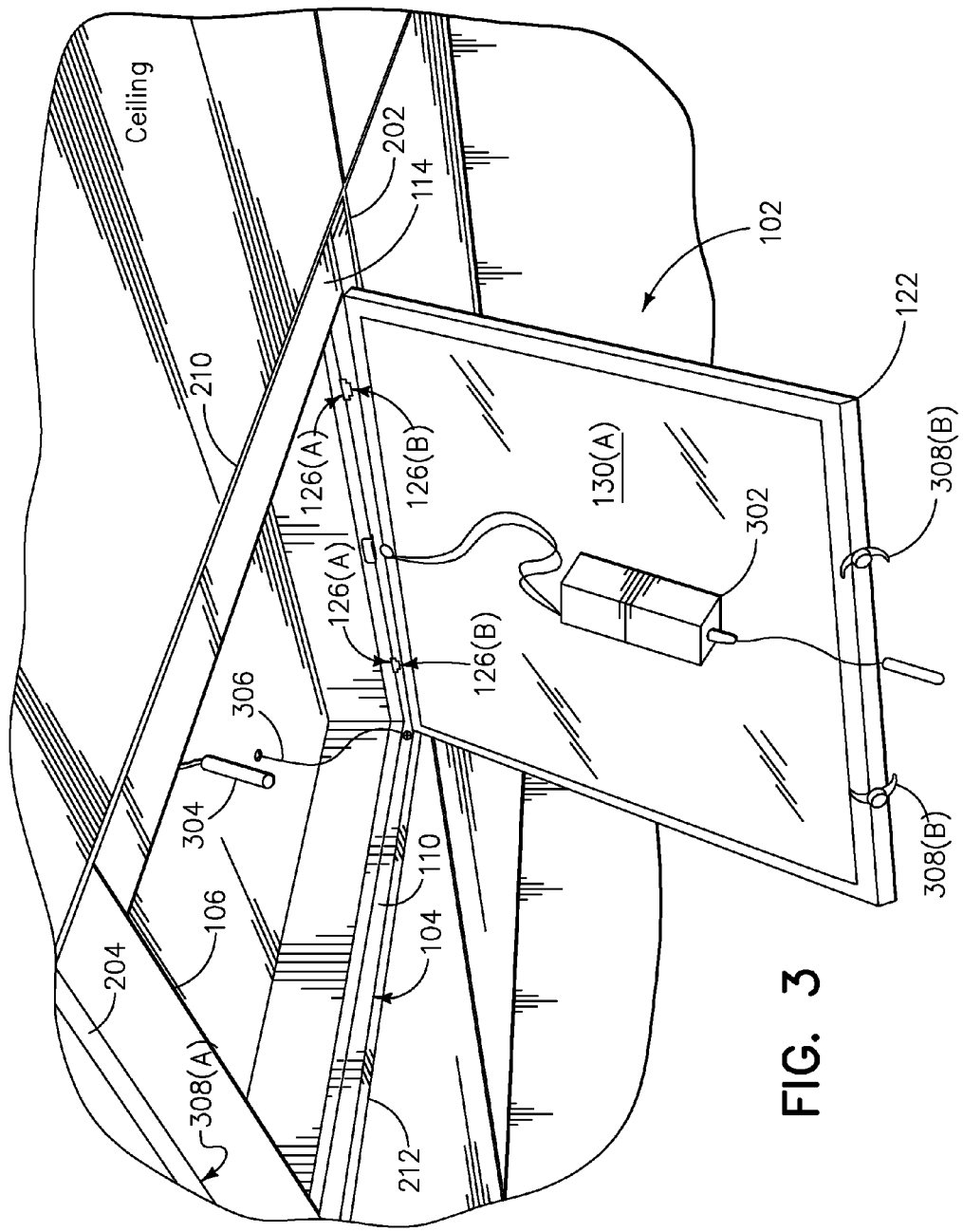
FIG. 3 depicts a perspective view of a LED lighting assembly pivotably coupled with a frame of the illustrative LED system shown in FIG. 1.

FIG. 3 depicts a perspective view of the LED lighting assembly 122 pivotably coupled with the frame 104 of the illustrative LED system 102 shown in FIG. 1. FIG. 3 illustrates the hinge member 126(A) arranged in the frame 104 and the mating hinge member 126(B) arranged in the LED lighting assembly 122. A driver 302 is illustrated as being disposed on the planar surface 130(A) of the LED lighting assembly 122. The driver 302 receives power from a power connect 304 protruding through an opening of the fluorescent light fixture 106. The power connect 304 may be wired to the existing power leads of the fluorescent light fixture 106. For example, the power connect 304 may be wired to the existing power leads of the fluorescent light fixture previously used to power the fluorescent light fixture's light bulbs.

FIG. 3 illustrates a tether 306 coupling the frame 104 to the fluorescent light fixture 106. The tether 306 may include a cable (e.g., a wire) formed of metal (e.g., steel) having cable fittings (e.g., eyelets) fixed to each end of the cable. The tether 306 may be installed to provide earthquake protection. For example, some ceiling suspension systems may include a fluorescent light fixture fixed/anchored to a structure (e.g., another floor above the ceiling suspension system) to keep the fluorescent light fixture from falling down during an earthquake. Because the tether 306 couples the frame 104 to the fluorescent light fixture 106, the LED system 102 is protected from falling down during an earthquake.

FIG. 3 illustrates the LED system 102 as including a latch member 308(A) arranged in the frame 104 and an associated latch member 308(B) arranged in the LED lighting assembly 122. The LED lighting assembly 122 may be pivotably coupled into the jamb 110 of the frame 104 and subsequently kept in the jamb 110 via the latch member 308(A) and the associated latch member 308(B). While FIG. 3 illustrates a latch mechanism (i.e., latch member 308(A) and associated latch member 308(B)) any other fastener may be used. For example, the LED system 102 may have a magnet arranged in the frame 104 and an associated magnet arranged in the LED lighting assembly 122 to keep the LED lighting assembly 122 in the jamb 110 of the frame 104.

Figure 4:
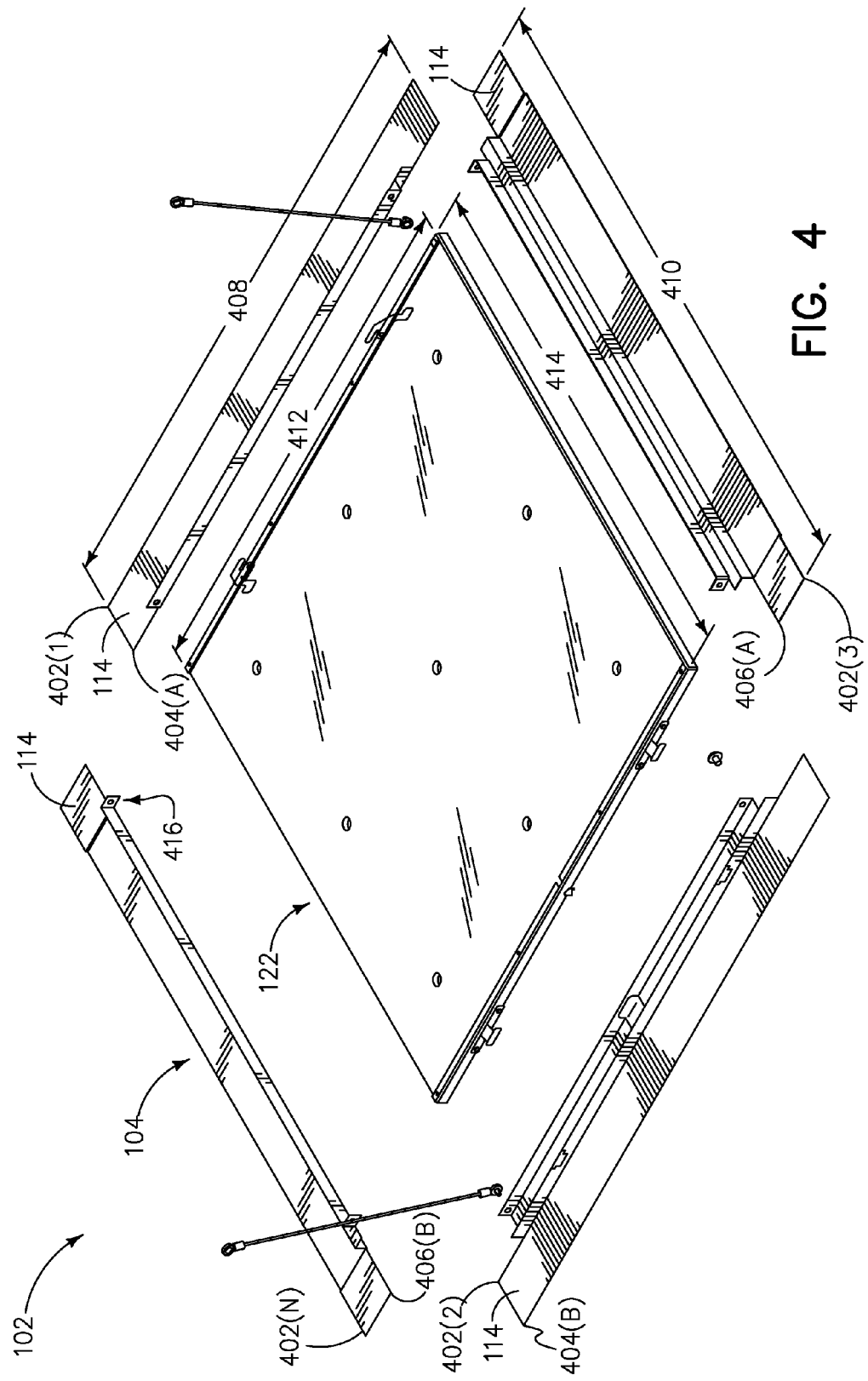
FIG. 4 depicts an isometric assembly view of the illustrative LED system installed under the fluorescent light fixture in FIG. 1.

FIG. 4 depicts an isometric assembly view of the illustrative LED system installed under the fluorescent light fixture in FIG. 1. Generally, the LED system 102 may include a grid shape of a ceiling suspension system (e.g., a rectangular shape having a (2'×2') grid shape, a (2'×4') grid shape, a (1'×4') grid shape, or any other similar grid shape). To provide for these, or any other grid shapes of a ceiling suspension system, the frame 104 and the LED lighting assembly 122 may each have geometric measurements (e.g., lengths and widths) based on a grid of a ceiling suspension system.

As such, FIG. 4 illustrates the frame 104 may include a plurality of rails 402(1), 402(2), 402(3), and 402(N), each of the rails 402(1)-402(N) having the flange 114 to be installed between the fluorescent light fixture 106 and a grid member (e.g., first grid member 202, second grid member 204, third grid member 210, and fourth grid member 212) of the ceiling suspension system 206. While FIG. 4 illustrates the plurality of rails 402(1)-402(N) as being four individual rails, the plurality of rails may be coupled to each other or formed as a single unit. For example, the plurality of rails 402(1)-402(N) may be coupled together, via a spring mechanism (e.g., a spring system attached to each rail), to provide for installing the plurality of rails 402(1)-402(N) as a unit under the fluorescent light fixture.

Further, the plurality of rails 402(1)-402(N) may be formed as a single unit, having living hinges (e.g., a living hinge attached between each rail), to provide for installing the plurality of rails 402(1)-402(N) as a single unit under the fluorescent light fixture. Further, the plurality of rails 402(1)-402(N) may be formed as two single units (e.g., two units, each unit having two rails coupled together) to provide for installing the plurality of rails 402(1)-402(N) as two separate units under the fluorescent light fixture 106.

FIG. 4 illustrates that the plurality of rails 402(1)-402(N) may include first and second side rails 404(A) and 404(B) and first and second end rails 406(A) and 406(B). Each of the side rails 404(A) and 404(B) and each of the end rails 406(A) and 406(B) having the flange 114 to be installed under the fluorescent light fixture 106. The side rails 404(A) and 404(B) may have a length 408 to provide for installing each of the side rails 404(A) and 404(B) between the third grid member 210 and the fourth grid member 212 of the ceiling suspension system 206. For example, the length 408 of the side rails 404(A) and 404(B) may be about 24 inches (61 centimeters), 48 inches (122 centimeters), or any other distance to provide for being installed between grid members of the ceiling suspension system 206.

The end rails 406(A) and 406(B) may have a length 410 to provide for installing each of the end rails 406(A) and 406(B) between the first grid member 202 and the second grid member 204 of the ceiling suspension system 206. For example, the length 410 of the end rails 406(A) and 406(B) may be about 12 inches (30 centimeters), 24 inches (61 centimeters), or any other distance to provide for being installed between grid members of the ceiling suspension system 206.

FIG. 4 illustrates the LED lighting assembly 122 may have a side length 412 and an end length 414 to provide for being received by the frame 104. For example, the side length 412 may be about the same as the length 408 (i.e., a distance of about 24 inches (61 centimeters), 48 inches (122 centimeters), or any other distance). Further, the side length 412 may provide for the side rails 404(A) and 404(B) to receive the sides of the LED lighting assembly 122.

FIG. 4 also illustrates the end length 414 may be about the same as the length 410 (i.e., a distance of about 12 inches (30 centimeters), 24 inches (61 centimeters), or any other distance). Further, the end length 414 may provide for the end rails 406(A) and 406(B) to receive the ends of the LED lighting assembly 122. While FIG. 4 illustrates the frame 104 having side rails 404(A) and 404(B) and end rails 406(A) and 406(B) to be installed between third and fourth grid members 210 and 212, and first and second grid members 202 and 204, respectively. The frame 104 may alternatively have side rails 404(A) and 404(B) and end rails 406(A) and 406(B) to be installed between first and second grid members 202 and 204, and third and fourth grid members 210 and 212, respectively.

FIG. 4 further illustrates a fastening mechanism 416 to fasten the plurality of rails 402(1)-402(N) together. While FIG. 4 illustrates threaded fasteners fastening each end of each the plurality of rails 402(1)-402(N) together, other mechanisms may be used to fix each the plurality of rails 402(1)-402(N) together. For example, each the plurality of rails 402(1)-402(N) may be press fit together, snap fit together, interference fit together, interlocked together, etc.

Figure 5:
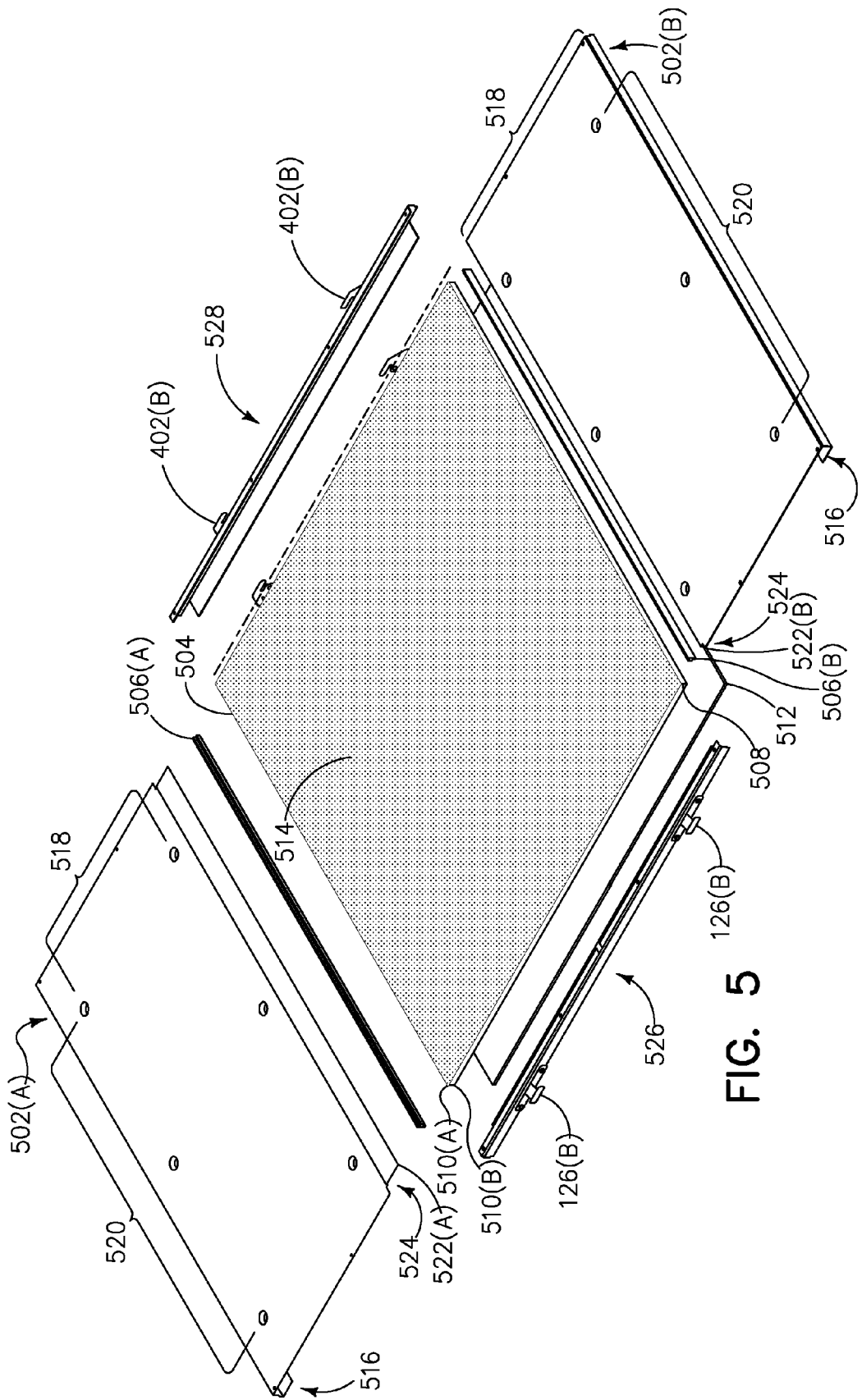
FIG. 5 depicts an isometric assembly view of an illustrative LED lighting assembly.

FIG. 5 depicts an isometric assembly view of an illustrative LED lighting assembly. The LED lighting assembly 122 may include heat spreaders 502(A) and 502(B) to house an optical waveguide 504. A plurality of LEDs 506(A) and 506(B) (e.g., a plurality of LED strips) may be arranged to inject light into the optical waveguide 504. The heat spreaders 502(A) and 502(B) may be formed of a material to dissipate heat from the LEDs housed in the channel. For example, the heat spreaders 502(A) and 502(B) may be formed of a sheet metal. The sheet metal may be aluminum, stainless steel, copper, brass, tin, nickel, titanium, or the like, to dissipate heat from the LEDs. FIG. 5 illustrates the plurality of LEDs 506(A) and 506(B) being arranged to inject light into an edge 508 of the optical waveguide 504.

The optical waveguide 504 may have a planar surface 510(A) opposite another planar surface 510(B) and the edge 508 disposed between the planar surfaces 510(A) and 510(B). The optical waveguide 504 may also include a diffuser 512. The diffuser 512 to lay flat on, and in compression with, the planar surface 510(B) when the LED lighting assembly 122 is assembled. The optical waveguide 504 may include a plurality of pockets 514 formed in the planar surface 510(A) to interfere with the light injected into the optical waveguide 504 by the plurality of LEDs 506(A) and 506(B). The plurality of pockets 514 may be formed in the planar surface via abrasive blasting (e.g., sandblasting, sodablasting, and/or bead blasting). The plurality of pockets may also be formed in the planar surface via laser etching, acid etching, machining, etc. The plurality of pockets may be formed in the planar surface in any pattern suitable to interfere with the light injected into the optical waveguide 504. The plurality of pockets 514 may also disperse the injected light in the optical waveguide 504. The optical waveguide 504 may then direct the injected light out of the planar surface 510(B). While FIG. 5 illustrates the optical waveguide 504 as including a rectangular slab formed of a polymer (i.e., polymethyl methacrylate (PMMA)), the optical waveguide 504 may be formed of any other material capable of guiding light. For example, the optical waveguide 504 may be formed of a glass, semiconductor, or the like. Further, other waveguide technologies may be used. For example the optical waveguide 504 may have microlenses embedded in the optical waveguide to distribute light.

The heat spreaders 502(A) and 502(B) may each have a channel 516 to house the edge 508 of the optical waveguide 504. The edge 508 of the optical waveguide 504 may have a height ranging from about 0.08 inches (2 millimeters) to about 0.2 inches (6 millimeters). The channel 516 may have a height to provide for housing the edge 508 of LED lighting assembly 122. Further, the channel 516 height may define the height 128 of the LED lighting assembly 122. The channel 516 may also house at least a portion of the plurality of LEDs 506(A) and 506(B) via a thermal interface. Each of the heat spreaders 502(A) and 502(B) may also have a plate 518 extending distal to the channel 516 to cover a portion (e.g., about half) of the planar surface 510(A) of the optical waveguide 504. The plate 518 may dissipate the heat generated from the portion of the plurality of LEDs 506(A) and 506(B) fixed in the channel 516 of the heat spreaders 502(A) and 502(B), respectively. The plate 518 may also have a plurality of dimples 520 to be forceably in contact with the portion of the planar surface 510(A). The dimples 520, forceably in contact with the portion of the planar surface 510(A), may provide pressure on the components (e.g., reflective components) of the optical waveguide 504. Because the dimples 520 are forceably in contact with the components of the optical waveguide 504, the dimples reduce any air gaps and/or pockets between the components of the optical waveguide 504. This minimizes losses and increases luminous efficacy and/or efficiency by forcing any injected light from the plurality of LEDs 506(A) and 506(B) to exit the optical waveguide 504 rather than dissipate in air gaps and/or pockets between the components. While FIG. 5 illustrates the plate 518 having dimples forceably in contact with the portion of the planar surface 510(A), any other feature may be used to provide pressure on the components of the optical waveguide 504. For example, the plate 518 may include creases or ribs formed in the plate 518 to provide pressure on the components of the optical waveguide 504. Further, the plate may include pads (e.g., rubber pads, neoprene pads, plastic pads, etc.) protruding from the plate to provide pressure on the components of the optical waveguide 504.

FIG. 5 illustrates the heat spreaders 502(A) and 502(B) may include interlocking features 522(A) and 522(B) formed in each end 524, opposite the channel 516, of the plate 518. The interlocking features 522(A) and 522(B) may interlock the heat spreaders 502(A) and 502(B) when the LED lighting assembly 122 is assembled. The LED lighting assembly 122 may include a hinge endcap 526. The hinge endcap 526 may be fixed to the heat spreaders 502(A) and 502(B) and may have the hinge member 126(B) arranged in the hinge endcap 526. The LED lighting assembly 122 may also include a latch endcap 528. The latch endcap 528 may be fixed to the heat spreaders 502(A) and 502(B), opposite the hinge endcap 526, and may have the latch member 402(B) arranged in the latch endcap 528.

Figure 6A:
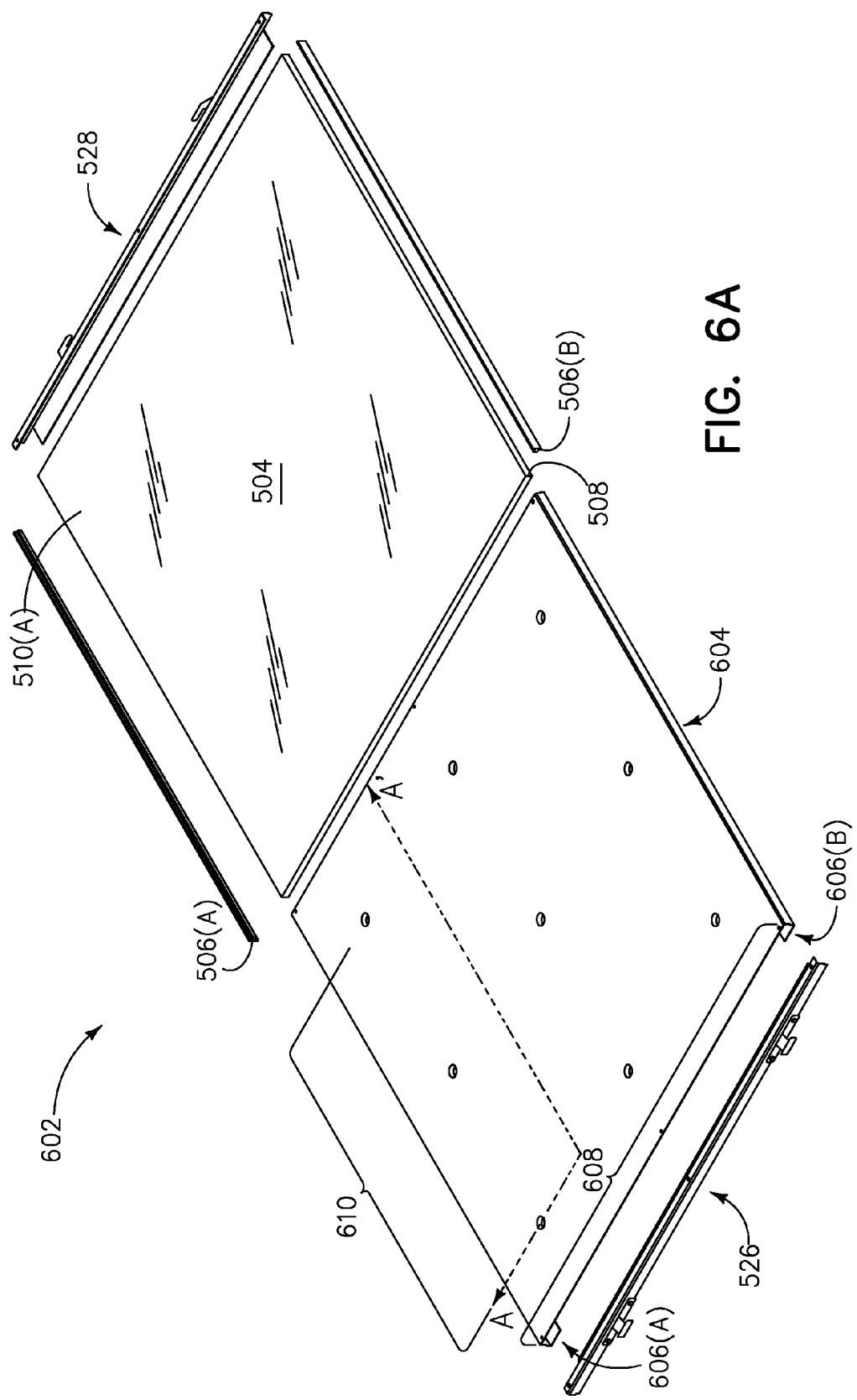
FIG. 6A depicts an isometric assembly view of another illustrative LED lighting assembly.

FIG. 6A depicts an isometric assembly view of another illustrative LED lighting assembly. The illustrative LED lighting assembly 602 may include many of the same components and features as the 122. Here, in this embodiment, the LED lighting assembly 602 may include a single unitary heat spreader 604 to house the optical waveguide 504. Again, the plurality of LEDs 506(A) and 506(B) may be arranged to inject light into an edge 508 of the optical waveguide 504. The heat spreader 604 may include a channel 606(A) opposite another channel 606(B) to house the edge 508 of the optical waveguide 504. The heat spreader 604 may be formed of aluminum, steel, copper, brass, composite, ceramic, or the like, to dissipate heat from the LEDs. The channels 606(A) and 606(B) may have the plurality of LEDs 506(A) and 506(B) fixed in the channels 606(A) and 606(B) via a thermal interface. The LED lighting assembly 602 may include a plate 608 extending between the channels 606(A) and 606(B) to cover the planar surface 510(A) of the optical waveguide 504. As discussed above with respect to FIG. 5, the plate 608 may dissipate the heat generated from the plurality of LEDs 506(A) and 506(B) fixed in the channels 606(A) and 606(B). The plate 608 may also have a plurality of dimples 610 forceably in contact with the planar surface 510(A). The dimples 610, forceably in contact with the portion of the planar surface 510(A), provide pressure on the optical waveguide 504 components (e.g., reflective components) to increase luminous efficacy and/or efficiency.

Figure 6B:
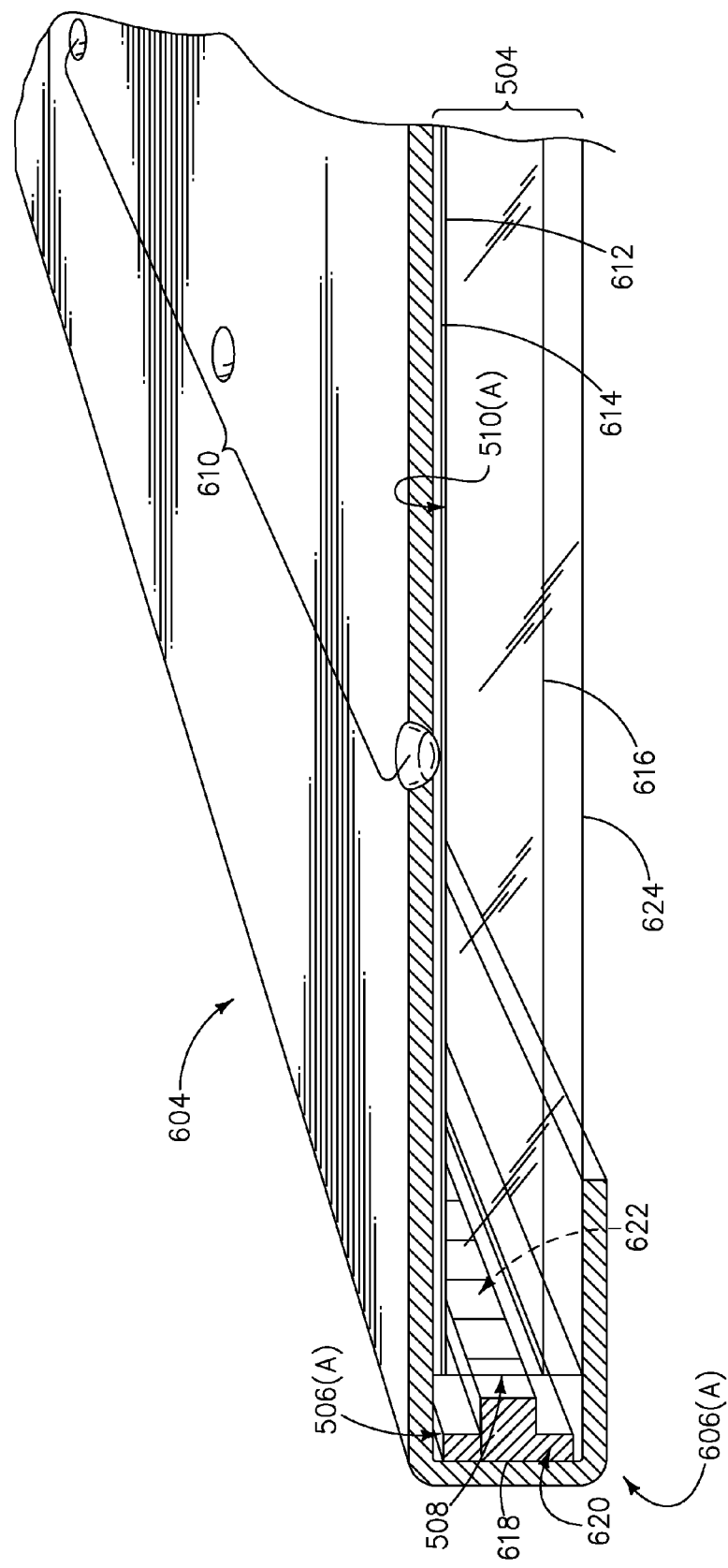
FIG. 6B depicts an illustrative section view of the LED lighting assembly 602 taken along line A-A' of FIG. 6A.

FIG. 6B depicts an illustrative section view of the LED lighting assembly 602 taken along line A-A' of FIG. 6A. FIG. 6B illustrates the dimples 610, forceably in contact with the portion of the planar surface 510(A). The dimples 610 apply pressure on the optical waveguide 504 components. FIG. 6A illustrates the optical waveguide 504 components including a sheet of reflective material 612 disposed between a sheet of backing material 614 and a slab optical waveguide 616. The dimples 610 are illustrated in FIG. 6B to be interfering with the sheet of backing material 614. The dimples 610 interfering with the sheet of backing material 614 providing pressure on the sheet of reflective material 612. The pressure applied to the sheet of reflective material 612 eliminating air gaps between the slab optical waveguide 616 and the sheet of reflective material 612. By eliminating air gaps between the slab optical waveguide 616 and the sheet of reflective material 612, this increases luminous efficacy and/or efficiency of the optical waveguide 504. While FIG. 6B illustrates the dimples 610 forceably in contact with the portion of the planar surface 510(A), any other feature may be used to provide pressure on the components of the optical waveguide 504. For example, the plate 608 of the heat spreader 604 may include creases or ribs formed in the plate 608 to provide pressure on the components of the optical waveguide 504.

FIG. 6B illustrates the plurality of LEDs 506(A) being arranged to inject light into an edge 508 of the optical waveguide 504 and housed in the channel 606(A). The plurality of LEDs 506(A) may be fixed to a wall 618 of the channel 606(A) via a thermal adhesive. The plurality of LEDs 506(A) includes an engine 620 and a plurality of emitters 622. The heat spreader 604 is to dissipate heat from the plurality of LEDs 506(A) fixed to the wall 618 of the channel 606(A). The dissipation of heat by the heat spreader 604 is to increase the hours of light provided by the plurality of LEDs 506(A). A diffuser 624 may also be included in the components of the optical waveguide 504.

The LED lighting assembly 602 may also include the hinge endcap 526 fixed to the heat spreader 604. Further, the LED lighting assembly 602 may also include the latch endcap 528 fixed to the heat spreader 604, opposite the hinge endcap 526.

Figure 7:
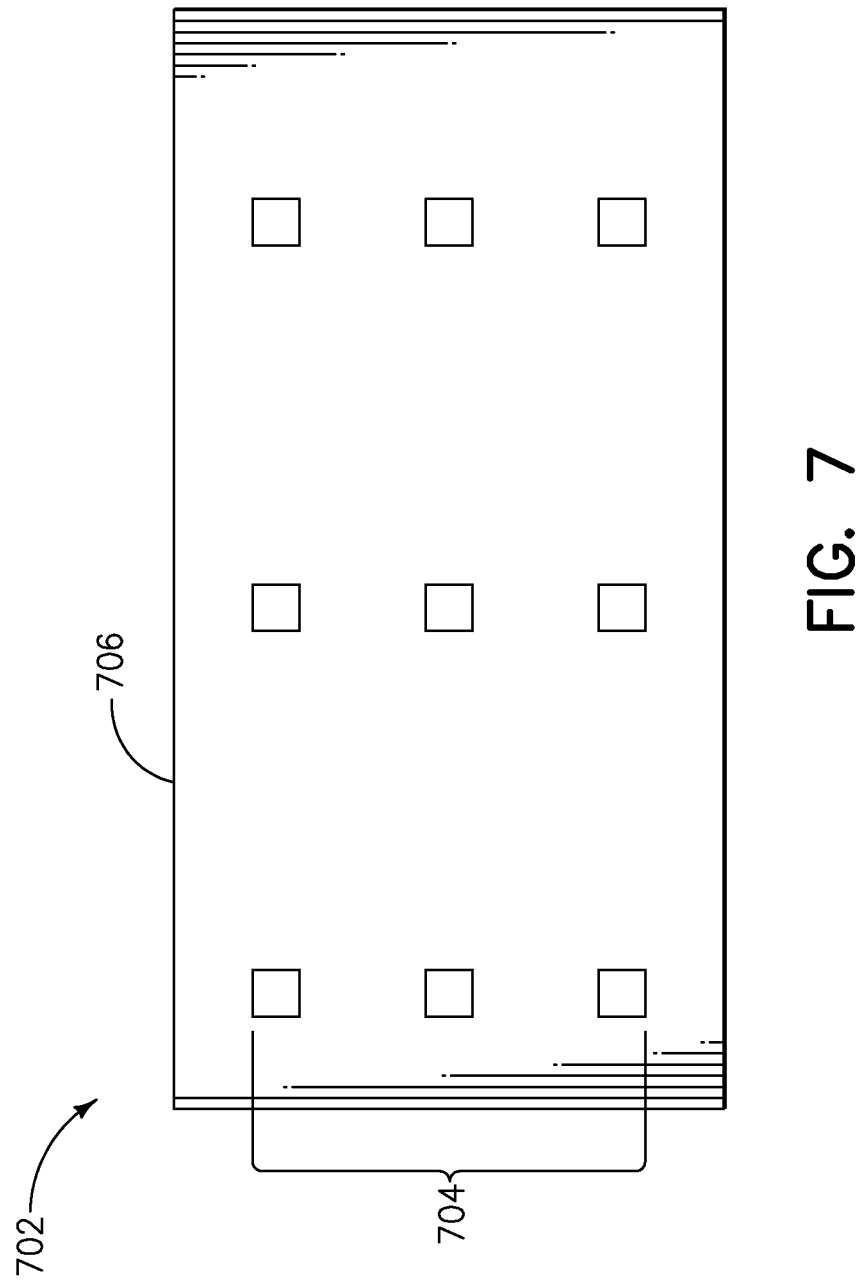
FIG. 7 depicts a top view of an illustrative optical waveguide comprising a plurality of LEDs arranged to inject light into a planar surface of the optical waveguide.

FIG. 7 depicts a top view of an illustrative optical waveguide including a plurality of LEDs arranged to inject light into a planar surface of the optical waveguide. FIG. 7 illustrates an optical waveguide 702 may include a plurality of LEDs 704 arranged above a planar surface 706 of the optical waveguide 702. Each LED of the plurality of LEDs 704 may be arranged to inject light into a side-throw optic disposed below each LED and arranged in the planar surface 706 (as discussed below in detail with respect to FIG. 8).

Figure 8:
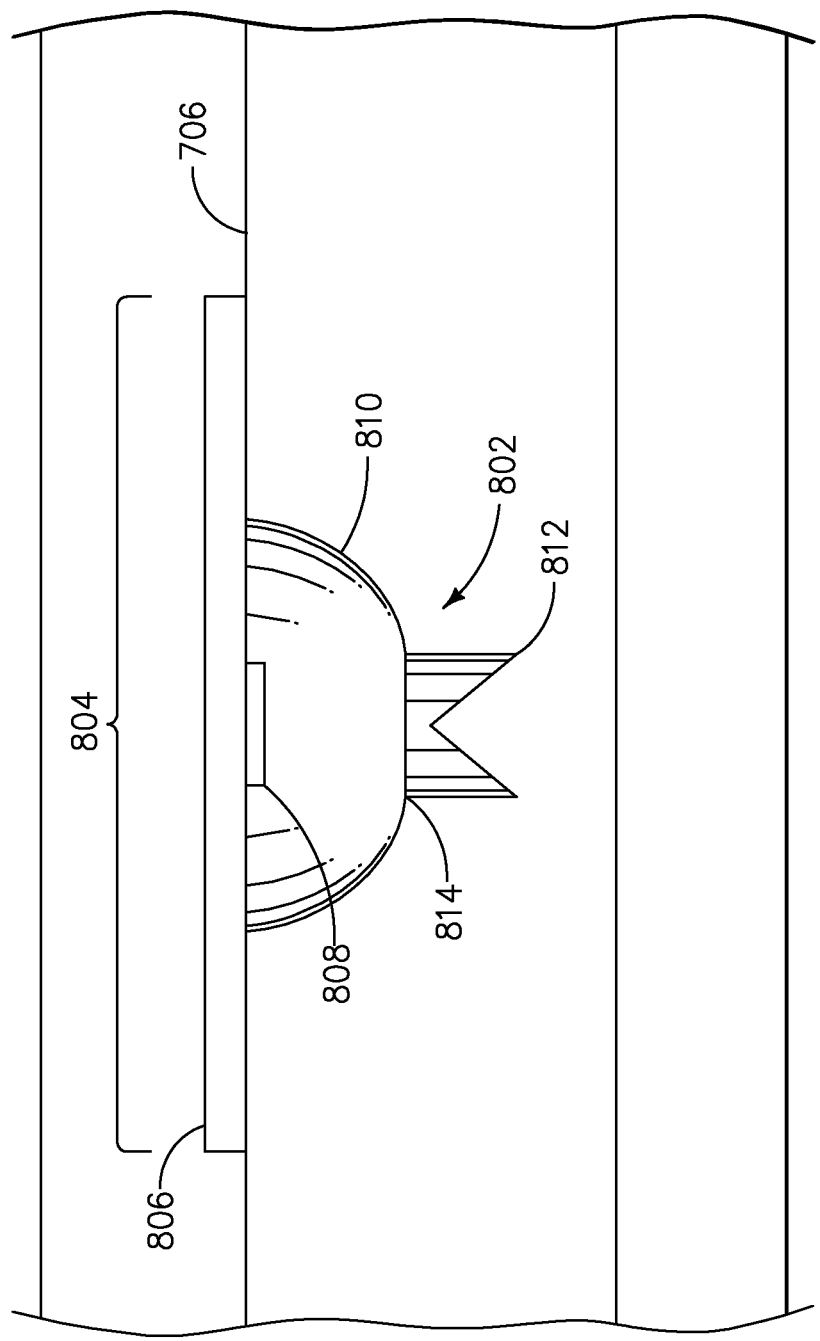
FIG. 8 depicts a side view of an illustrative side-throw optic molded in the planar surface of the optical waveguide of FIG. 7.

FIG. 8 depicts a side view of an illustrative side-throw optic molded in the planar surface of the optical waveguide of FIG. 7. FIG. 8 illustrates the optical waveguide 702 may include a side-throw optic 802 arranged in the planar surface 706 of the optical waveguide 702. FIG. 8 further illustrates an LED 804 of the plurality of LEDs 704 may be arranged to inject light into the side-throw optic 802 disposed below each LED 804 of the plurality of LEDs 704. Each side-throw optic 802 may be molded into the planar surface 706 of the optical waveguide 702. Further, each LED 804 may include an engine 806 and an emitter 808. The side-throw optic 802 may have a bowl shaped surface 810 to refract light injected into the side-throw optic 802 by the emitter 808. The side-throw optic 802 may also have a reflective tip 812 disposed on an end 814 of the bowl shaped surface 810 to reflect light injected into the side-throw optic 802 by the emitter 808. The optical waveguide 702 may also include the plurality of pockets 514 formed in the planar surface 706 of the optical waveguide 702. While FIG. 7 illustrates the optical waveguide 702 as a rectangular slab formed of a polymer (i.e., polymethyl methacrylate (PMMA)), the optical waveguide 702 may be formed of any other material capable of guiding light. For example, the optical waveguide 702 may be formed of a glass, semiconductor, or the like.

By utilizing a plurality of side-throw optics 802 molded into the planar surface 706 of the optical waveguide 702, the optical waveguide 702 may be decontented. For example, because the plurality of side-throw optics 802 disperses injected light directly into the optical waveguide 702, the injected light doesn't span the distance from an edge of the optical waveguide towards the center of the optical waveguide. As such, a plurality of side-throw optics molded into a planar surface of an optical waveguide is more efficient than a plurality of LEDs arranged to inject light into an edge of an optical waveguide. Therefore, the plurality of LEDs 704 may have fewer LEDs arranged above the planar surface 706 than LEDs 506(A) and 506(B) arranged around the edge 508. Further, by reducing the quantity of LEDs injecting light into an optical waveguide, cost and energy consumption are reduced.

Exemplary Method of Retrofitting a Light Fixture

Figure 9:
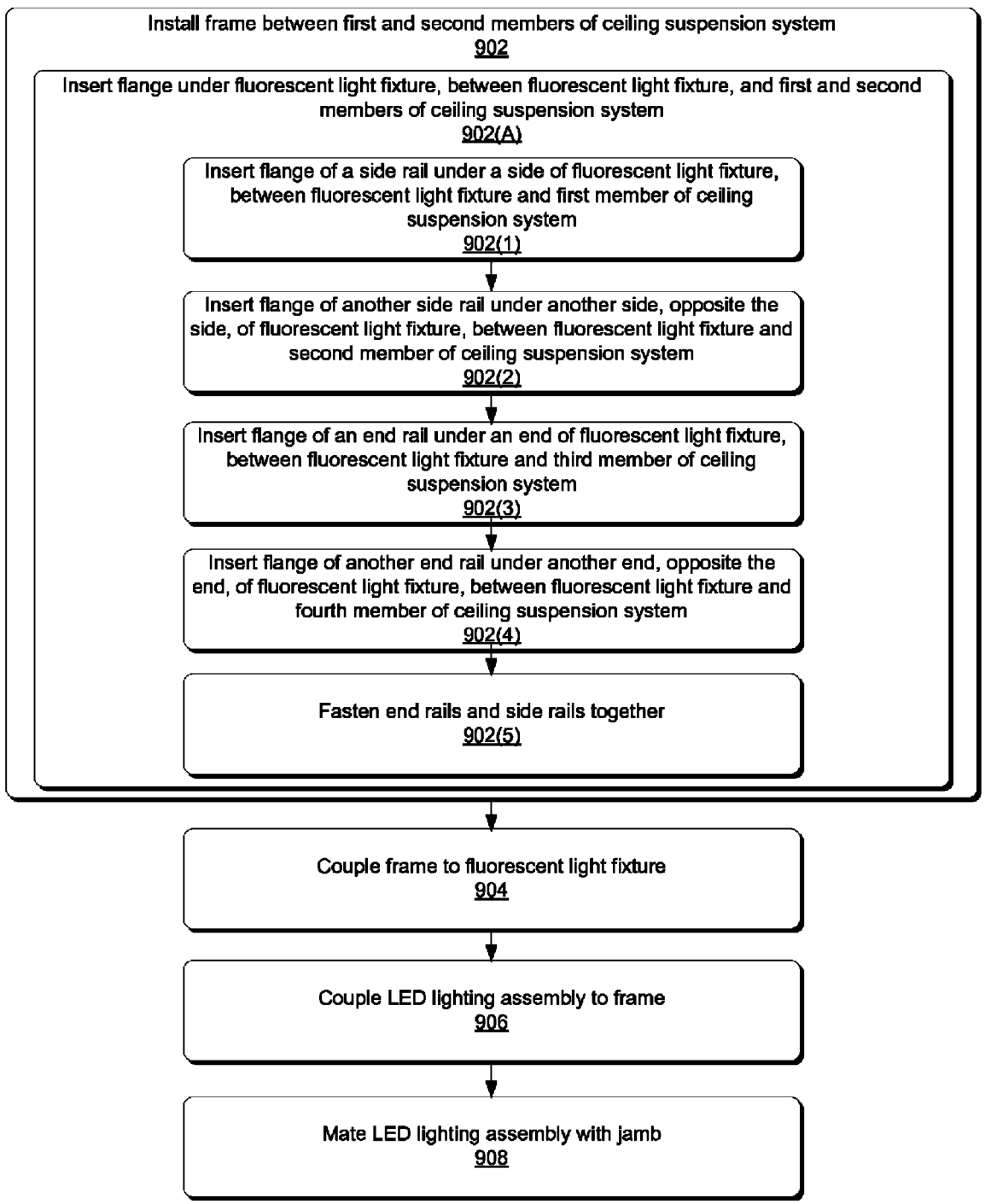
FIG. 9 is a flow diagram of an illustrative process for retrofitting an existing light fixture with the illustrative LED system of FIG. 1.

FIG. 9 is a flow diagram of an illustrative process for retrofitting a light fixture with the illustrative light-emitting diode (LED) system of FIG. 1. For convenience, the process 900 will be described with reference to the LED system 102 as illustrated in FIG. 1, but the process 900 is not limited to use with this system. For instance, an installer may perform this process 900 to install the LED system in a new ceiling suspension system and not under an existing fluorescent light fixture. In some instances, the user may perform this process in a building restoration environment, in a building construction environment, or in a place of residence. As used herein, a building may be a multi-storey building, a commercial building, a residential building, an office building, an industrial building, or the like. While FIG. 9 illustrates a process 900 for retrofitting a fluorescent light fixture with a LED system, it is to be appreciated that this process may apply to retrofitting any type lighting system with a LED system.

Process 900 includes an operation 902, which represents installing a frame (e.g., frame 104) between a first grid member (e.g., first grid member 202) and a second grid member (e.g., second grid member 204) of a ceiling suspension system (e.g., ceiling suspension system 206). The frame including a jamb (e.g., jamb 110) arranged around an inside perimeter (e.g., inside perimeter 112) of the frame. In some embodiments the frame may include a plurality of rails (e.g., plurality of rails 402(1)-402(N)) having a flange (e.g., flange 114) arranged around an outside perimeter (e.g., outside perimeter 116) of the frame opposite the jamb. The plurality of rails may be coupled to each other or formed as a single unit. For example, the plurality of rails may be coupled together, via a spring mechanism, to provide for installing the plurality of rails as a unit under the fluorescent light fixture, between the fluorescent light fixture and the first and second grid members of the ceiling suspension system. In this embodiment, process 900 may include operation 902(A), which represents inserting the flange of the frame under the fluorescent light fixture, between the fluorescent light fixture and the first and second grid members of the ceiling suspension system. For example, an installer may simply elevate (i.e., push up) the existing fluorescent light fixture and insert the flange under the fluorescent light fixture, between the fluorescent light fixture and the first and second grid members of the ceiling suspension system.

In another embodiment, the plurality of rails may include end rails (e.g., end rails 406(A) and 406(B)) and side rails (e.g., side rails 404(A) and 404(B)). The end rails and side rails having the flange to be installed under the fluorescent light fixture, between the fluorescent light fixture and first, second, third, and fourth grid members (e.g., as illustrated in FIG. 2) of the ceiling suspension system. In this embodiment, process 900 may include operations 902(1), 902(2), 902(3), 902(4), and 902(5). Operation 902(1) represents inserting a flange of a side rail under a side of the fluorescent light fixture, between the fluorescent light fixture and the first grid member of the ceiling suspension system. Operation 902(2) represents inserting a flange of another side rail under another side, opposite the side, of the fluorescent light fixture, between the fluorescent light fixture and the second grid member of the ceiling suspension system. Operation 902(3) represents inserting a flange of an end rail under an end of the fluorescent light fixture, between the fluorescent light fixture and a third grid member of the ceiling suspension system. Operation 902(4) represents, inserting a flange of another end rail under another end, opposite the end, of the fluorescent light fixture, between the fluorescent light fixture and a fourth grid member of a ceiling suspension system. Operation 902(5) represents, fastening the end rails and side rails together via a fastener (e.g., fastener 416) to complete the installation of the frame.

Next, operation 904 represents coupling the frame to the fluorescent light fixture via a tether (e.g., tether 306) to provide earthquake protection. Operation 904 is followed by operation 906, which represents coupling a LED lighting assembly (e.g., LED lighting assembly 122) to the frame (e.g., as illustrated in FIG. 3). Process 900 is complete when, at operation 908, an installer mattes at least a portion of the LED lighting assembly with the jamb (e.g., as illustrated in FIG. 2).

CONCLUSION

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. For example, in various embodiments, any of the structural features and/or methodological acts described herein may be rearranged, modified, or omitted entirely. For example, the shape, size, and configuration of the LED systems may be varied.

What is claimed is:

1. A light-emitting diode (LED) system to retrofit a light fixture comprising:
    a frame to be installed under a light fixture installed in a ceiling suspension system, the frame having a perimeter and defining an interior opening, the frame comprising;
    a plurality of rails, each of the rails having:
        a light seal surface arranged around the perimeter and extending into the interior opening, and
        a flange arranged to project externally from the perimeter away from the interior opening and opposite the light seal surface for installation between the light fixture and a rail of the ceiling suspension system; and
    a LED lighting assembly detachably couplable to the frame such that at least a portion of the LED lighting assembly is received by the light seal surface of the frame.

2. The LED system according to claim 1, wherein the plurality of rails comprises four rails, including first and second end rails and first and second side rails.

3. The LED system according to claim 1, further comprising a fastening mechanism to fasten the plurality of rails together.

4. The LED system according to claim 1, wherein the LED lighting assembly is pivotably coupled to the frame via a pair of cooperating hinge members, including a first hinge member attached to the frame and a second hinge member attached to the LED lighting assembly.

5. The LED system according to claim 1, wherein the LED lighting assembly is removably coupled to the frame via a latch mechanism.

6. The LED system according to claim 1, further comprising a tether having a first end fastened to the frame and a second end for fastening to the light fixture.

7. The LED system according to claim 1, wherein the LED lighting assembly comprises:

an optical waveguide having a co-planar surfaces and an edge separating the co-planar surfaces; and a plurality of LEDs arranged to inject light into the optical waveguide where the light is dispersed out of at least one of the co-planar surfaces.

8. The LED system according to claim 7, wherein the plurality of LEDs are arranged adjacent to one of the surfaces and arranged to inject light into the one surface.

9. The LED system according to claim 8, wherein individual ones of the LEDs inject light into corresponding side-throw optics arranged in the one surface.

10. The LED system according to claim 9, wherein the side-throw optics are molded into the one surface.

11. The LED system according to claim 7, wherein the plurality of LEDs are arranged to inject light into the edge.

12. The LED system according to claim 11, wherein the LED lighting assembly further comprises a heat spreader, the heat spreader comprising:

a channel to house the edge of the optical waveguide and at least a portion of the LEDs via a thermal interface; and a plate extending distal to the channel covering a portion of one of the co-planer surfaces of the optical waveguide to dissipate heat from the LEDs housed in the channel, the plate having one or more dimples forceably in contact with the portion of the one surface.

13. The LED system according to claim 11, wherein the LED lighting assembly further comprises a heat spreader, the heat spreader comprising:

opposing first and second channels, the first and second channels housing the edge of the optical waveguide and the LEDs via a thermal interface; and a plate extending between the first and second channels covering one of the co-planar surfaces of the optical waveguide to dissipate heat, the plate having one or more dimples forcibly in contact with the one surface.

14. The LED system according to claim 7, wherein the optical waveguide comprises a plurality of pockets abrasively blasted in the other planar surface to interfere with the light injected into the optical waveguide and disperse the light in the optical waveguide.

15. The LED system according to claim 14, wherein the optical waveguide comprises a rectangular slab of polymethyl methacrylate (PMMA).

16. A method of retrofitting a pre-existing light fixture with a light-emitting diode (LED) system, the method comprising:

under a pre-existing light fixture installed in a ceiling suspension system, installing a frame between a first grid member and a second grid member of the ceiling suspension system, the frame comprising a plurality of rails, each of the rails having: (i) a jamb arranged around an inside perimeter of the frame, and (ii) a flange arranged around an outside perimeter of the frame opposite the jamb for installation between the pre-existing light fixture and the first and second grid members of the ceiling suspension system, wherein installing the frame comprises inserting the flanges between the pre-existing light fixture and the first and second grid members of the ceiling suspension system; and coupling a LED lighting assembly to the frame so that when the LED lighting assembly nestles into the jamb, the LED lighting assembly overlays the pre-existing light fixture to cover the pre-existing light fixture without having to remove the pre-existing light fixture.

17. The method of claim 16, wherein the LED lighting assembly comprises:

an optical waveguide having a first planar surface opposite a second planar surface and an edge disposed between the first and second planar surfaces;

a plurality of LEDs arranged to inject light into the optical waveguide and the optical waveguide arranged to redirect the injected light to exit the first planar surface; and matting at least a portion of the LED lighting assembly with the jamb.

18. The method of claim 17, wherein the LED lighting assembly further comprises:

a heat spreader comprising a plate covering the second planar surface to dissipate heat from the plurality of LEDs, the plate having a dimple forceably in contact with the second planar surface; and a plurality of pockets formed in the second planar surface of the optical waveguide to interfere with the light injected into the optical waveguide.

19. The method of claim 16, wherein the plurality of rails comprises end rails and side rails, the end rails and side rails having the flange, and installing the frame comprises:

inserting a flange of a side rail under a side of the pre-existing light fixture, between the pre-existing light fixture and the first grid member of a ceiling suspension system;

inserting a flange of another side rail under another side, opposite the side, of the pre-existing light fixture, between the pre-existing light fixture and the second rail of the ceiling suspension system;

inserting a flange of an end rail under an end of the pre-existing light fixture, between the pre-existing light fixture and a third grid member of the ceiling suspension system; and inserting a flange of another end rail under another end, opposite the end, of the pre-existing light fixture, between the pre-existing light fixture and a fourth grid member of the ceiling suspension system.

20. The method of claim 16 further comprising coupling the frame to the pre-existing light fixture via a tether to provide earthquake protection.

21. A frame to retrofit a light fixture installed in a ceiling comprising:

a flange arranged around an outside perimeter of the frame;

a jamb arranged around an inside perimeter of the frame opposite the flange;

a side rail having the flange, the side rail flange to be installed under the light fixture, between the light fixture and a first grid member of the ceiling suspension system;

another side rail having the flange, the other side rail flange to be installed under the light fixture, between the light fixture and a second grid member, opposite the first grid member, of the ceiling suspension system;

an end rail having the flange, the end rail flange to be installed under the light fixture, between the light fixture and a third grid member of the ceiling suspension system; and another end rail having the flange, the other end rail flange to be installed under the light fixture, between the light fixture and a fourth grid member, opposite the third grid member, of the ceiling suspension system.

22. The frame according to claim 21, wherein the flange comprises a material thickness of about 0.04 inches (1 millimeter).

23. The frame according to claim 21, wherein each of the side rails have a length to provide for installing each of the side rails between the first grid member and the second grid member of the ceiling suspension system.

24. The frame according to claim 23, wherein the first grid member and the second grid member of the ceiling suspension system are separated by a distance of about 24 inches (61 centimeters).

25. The frame according to claim 23, wherein the first grid member and the second grid member of the ceiling suspension system are separated by a distance of about 12 inches (30 centimeters).

26. The frame according to claim 21, wherein each of the end rails have a length to provide for installing each of the end rails between the third grid member and the fourth grid member of the ceiling suspension system.

27. The frame according to claim 26, wherein the third grid member and the fourth grid member of the ceiling suspension system are separated by a distance of about 24 inches (61 centimeters).

28. The frame according to claim 26, wherein the third grid member and the fourth grid member of the ceiling suspension system are separated by a distance of about 48 inches (122 centimeters).

29. A light-emitting diode (LED) system to retrofit a pre-existing light fixture comprising:

a pre-existing light fixture installed in a ceiling suspension system;

a frame installed under the pre-existing light fixture, the frame having a perimeter and comprising a plurality of rails each of the rails having a light seal surface arranged around the perimeter, and a flange arranged to project externally from the perimeter away from the interior and opposite the light seal surface and installed between the pre-existing light fixture and a rail of a ceiling suspension system; and a LED lighting assembly detachably couplable to the frame such that at least a portion of the LED lighting assembly is received by the light seal surface of the frame.

30. The LED system according to claim 29, wherein the pre-existing light fixture installed in the ceiling suspension system includes a lamp holder cavity for holding one or more fluorescent bulbs, and when the LED lighting assembly is received by the light seal surface of the frame the LED lighting assembly covers the lamp holder cavity.

* * * * *